US009546021B2

(12) United States Patent
Stover et al.

(10) Patent No.: US 9,546,021 B2
(45) Date of Patent: Jan. 17, 2017

(54) APPARATUS FOR STORING, TRANSPORTING AND DISTRIBUTING KEGS

(71) Applicants: Carl Stover, Ostrander, OH (US); Craig T. Jones, Johnstown, OH (US); Dennis Weber, Delaware, OH (US)

(72) Inventors: Carl Stover, Ostrander, OH (US); Craig T. Jones, Johnstown, OH (US); Dennis Weber, Delaware, OH (US)

(73) Assignee: Diverse Holdings, LLC, Delaware, OH (US)

( * ) Notice: Subject to any disclaimer, the term of this patent is extended or adjusted under 35 U.S.C. 154(b) by 194 days.

(21) Appl. No.: 14/177,167

(22) Filed: Feb. 10, 2014

(65) Prior Publication Data

US 2014/0227067 A1 Aug. 14, 2014

Related U.S. Application Data

(60) Provisional application No. 61/762,932, filed on Feb. 10, 2013.

(51) Int. Cl.
    *B65G 1/06* (2006.01)
    *B65D 19/44* (2006.01)
    *B65G 1/04* (2006.01)

(52) U.S. Cl.
    CPC .............. *B65D 19/44* (2013.01); *B65G 1/04* (2013.01); *B65G 1/06* (2013.01); *B65D 2519/0081* (2013.01); *B65D 2519/0097* (2013.01); *B65D 2519/00273* (2013.01); *B65D 2519/00323* (2013.01); *B65D 2519/00333* (2013.01); *B65D 2519/00532* (2013.01); *B65D 2519/00701* (2013.01); *B65D 2519/00805* (2013.01); *B65G 2201/0241* (2013.01)

(58) Field of Classification Search
    CPC ............. B65G 1/04; B65G 1/06; B65G 1/026; B65G 1/0407; A47B 57/265; A47B 81/007; A47F 1/12; A47F 5/0081; A47F 7/28
    USPC .......................... 414/267, 288, 304; 211/189
    See application file for complete search history.

(56) References Cited

U.S. PATENT DOCUMENTS

| | | | | |
|---|---|---|---|---|
| 4,113,119 A | * | 9/1978 | Brown | B65G 1/0421 187/360 |
| 5,333,950 A | * | 8/1994 | Zachrai | H05K 7/183 108/180 |
| 6,487,979 B2 | * | 12/2002 | Ash | A47B 5/02 108/134 |

(Continued)

*Primary Examiner* — Jonathan Snelting
(74) *Attorney, Agent, or Firm* — Miracle IP; Bryce D. Miracle

(57) ABSTRACT

A method and apparatus for storing, transporting and distributing kegs. The apparatus comprising a keg shelving assembly with two or more stacked shelves. The shelves containing individual keg slots formed by two or more horizontally disposed rails. Stored kegs within the keg slots are accessed by a vertical sliding frame within a fixed frame vertical guidance assembly. A hinged platform is fixed to the vertical sliding frame having an open, horizontal position and a close vertical position relative to the vertical sliding frame. The apparatus further comprises a braking assembly that utilizes the downward force created by a load on the platform, to create a braking action opposing the downward force. This action allows a user to easily and efficiently lower a keg from one of the stacked shelves.

22 Claims, 11 Drawing Sheets

(56) References Cited

U.S. PATENT DOCUMENTS

| | | | | |
|---|---|---|---|---|
| 6,830,132 B1* | 12/2004 | Kang | ...................... | B66B 9/022 |
| | | | | 187/271 |
| 7,757,615 B2* | 7/2010 | McDonald, II | ...... | A47B 46/005 |
| | | | | 108/108 |
| 8,485,618 B2* | 7/2013 | Benz | ...................... | A47B 57/06 |
| | | | | 312/312 |
| 8,616,388 B2* | 12/2013 | Butler | .................... | A47B 43/00 |
| | | | | 108/106 |
| 2002/0179555 A1* | 12/2002 | Pater | ...................... | B65G 1/023 |
| | | | | 211/151 |
| 2005/0184020 A1* | 8/2005 | Thibodeau | ............. | B65D 19/44 |
| | | | | 211/189 |
| 2006/0151255 A1* | 7/2006 | Payne | ...................... | B66B 5/16 |
| | | | | 187/351 |
| 2013/0216339 A1* | 8/2013 | Apps | ................... | A47B 81/007 |
| | | | | 414/304 |

* cited by examiner

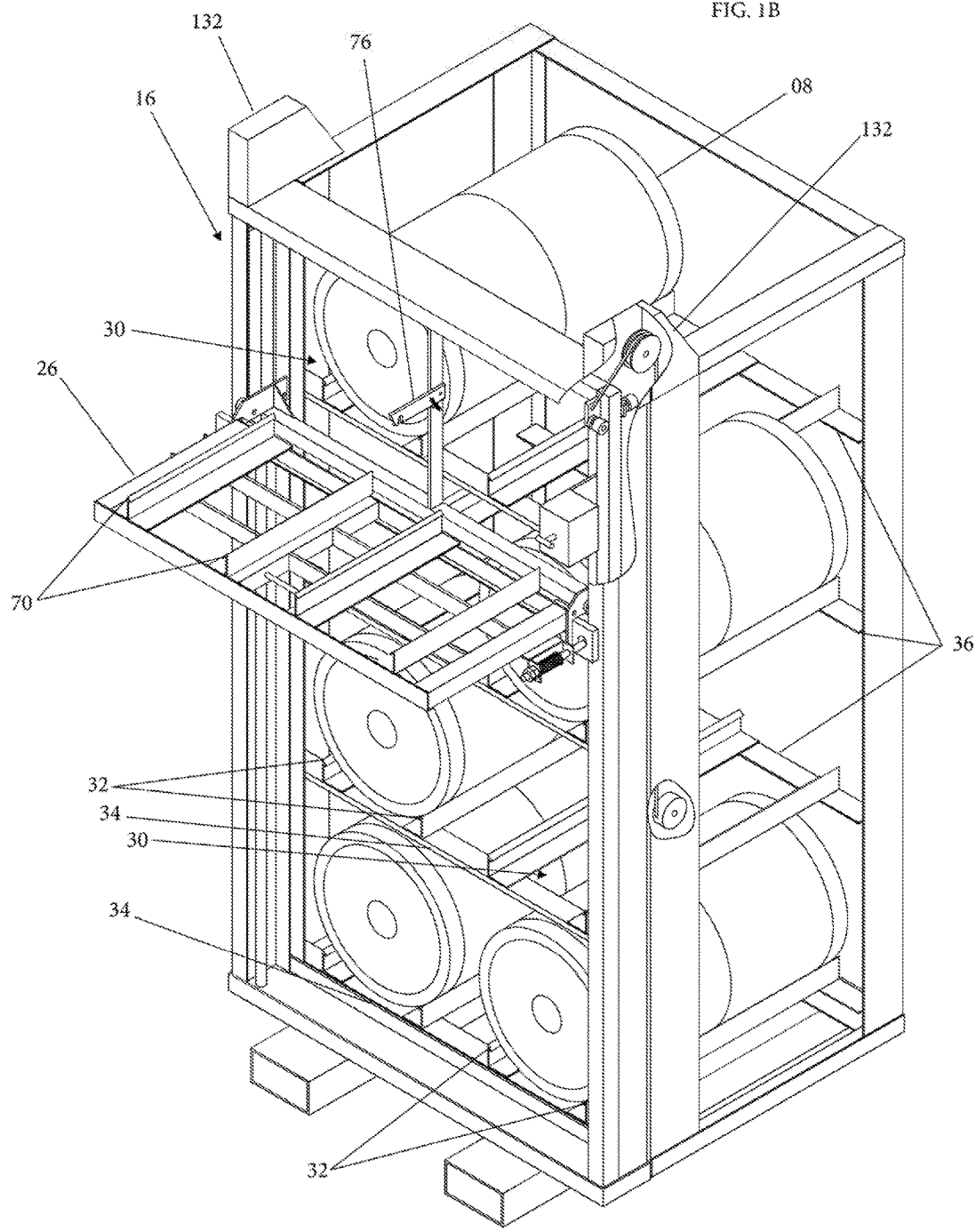

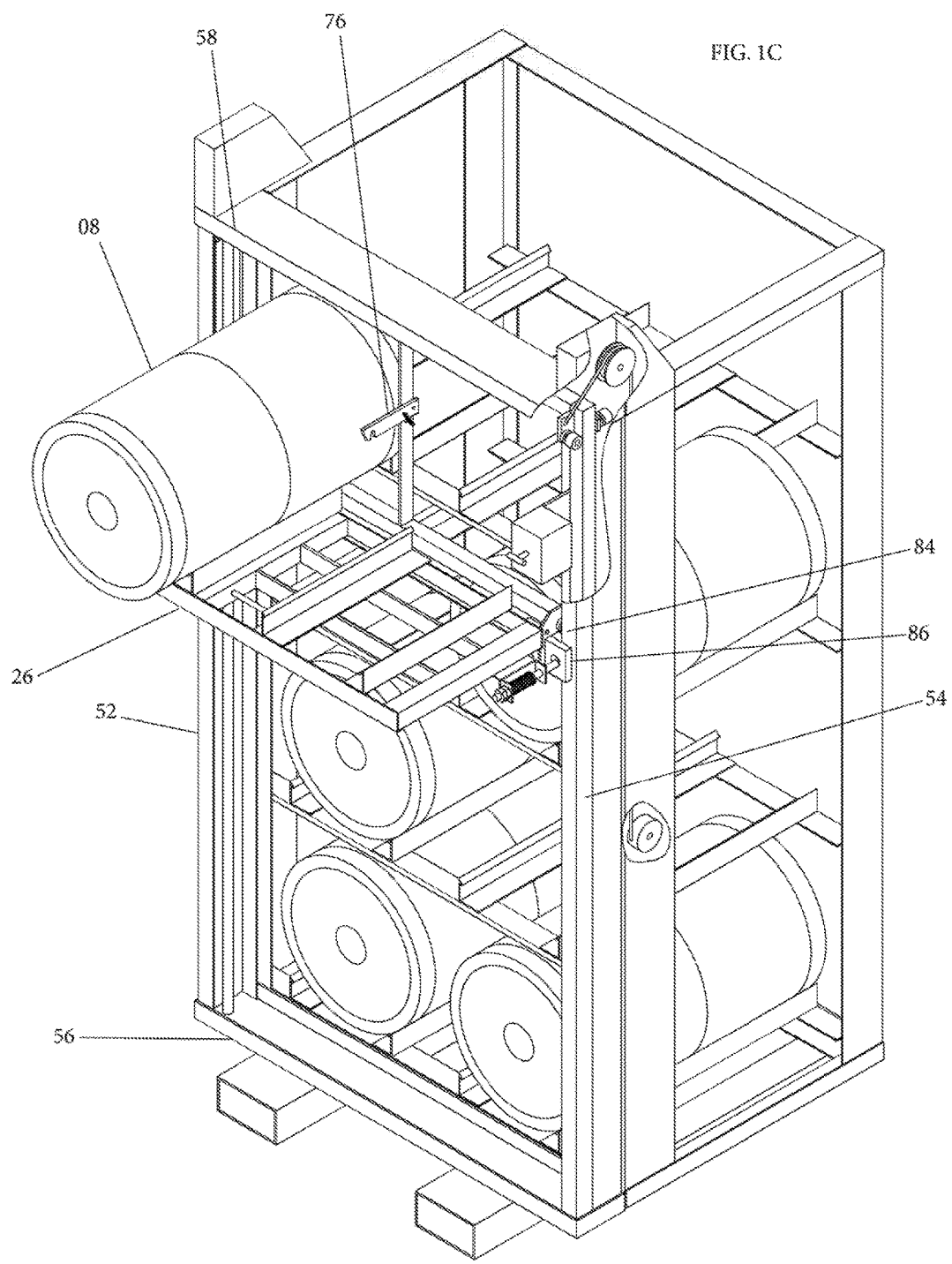

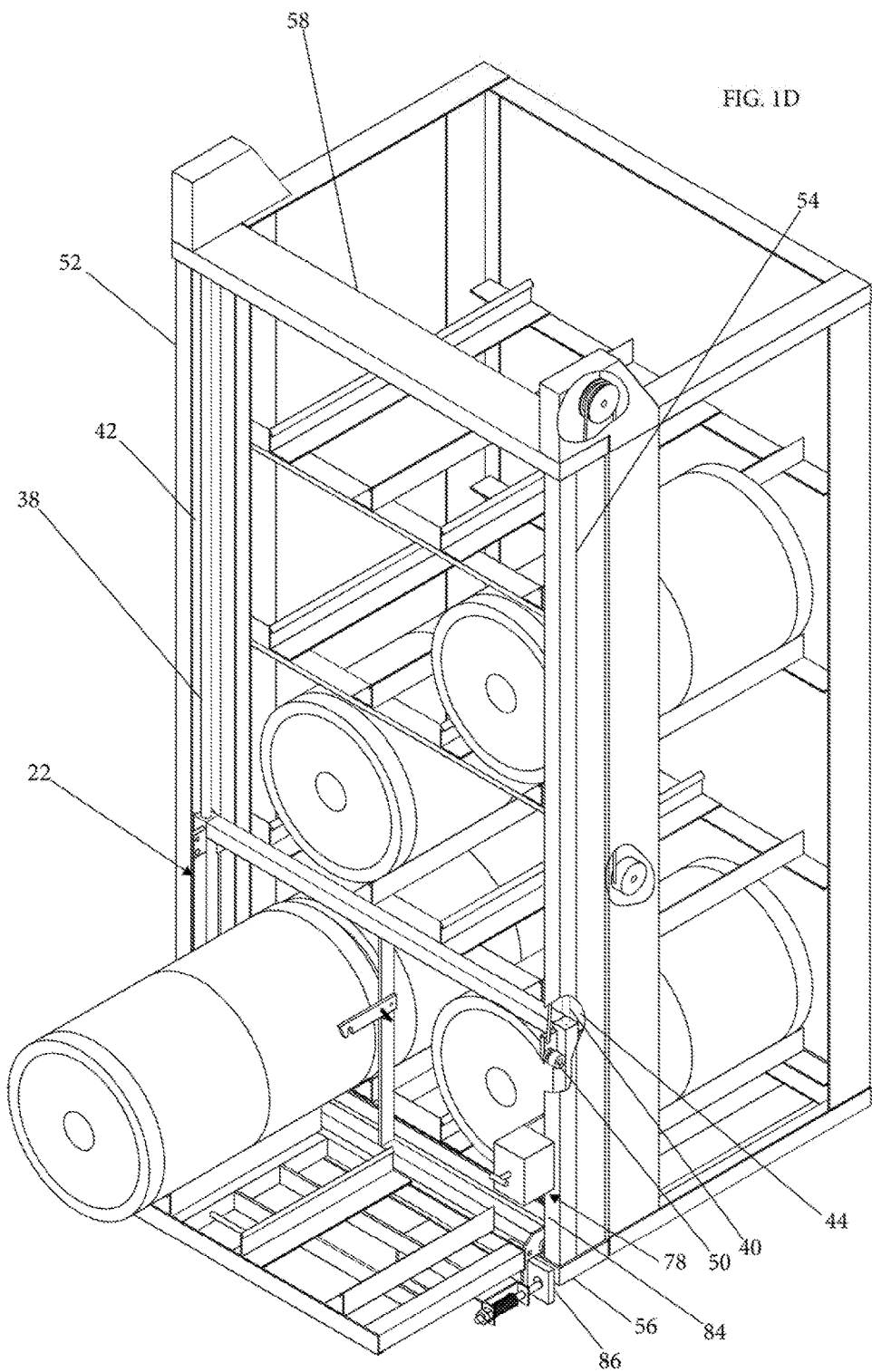

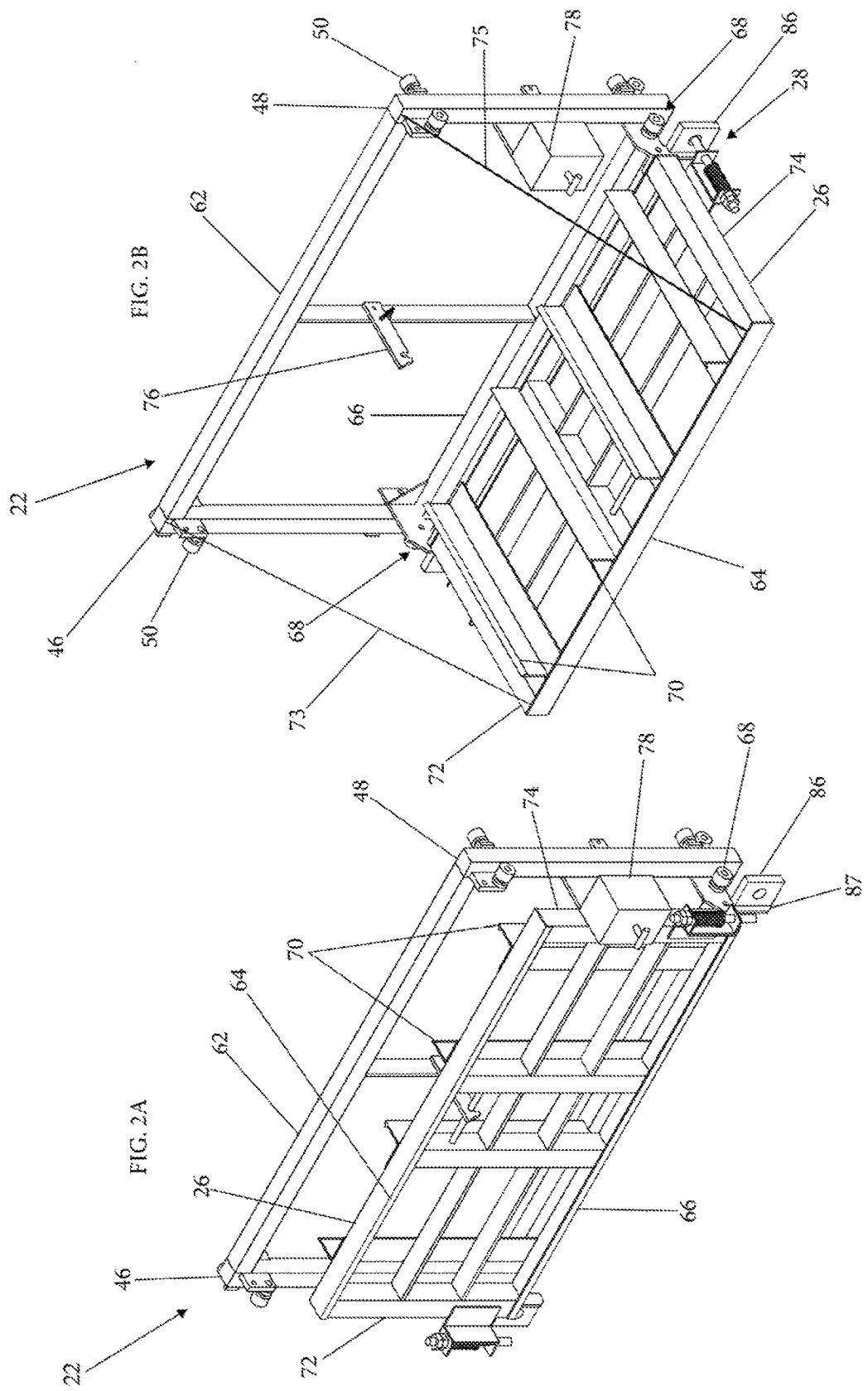

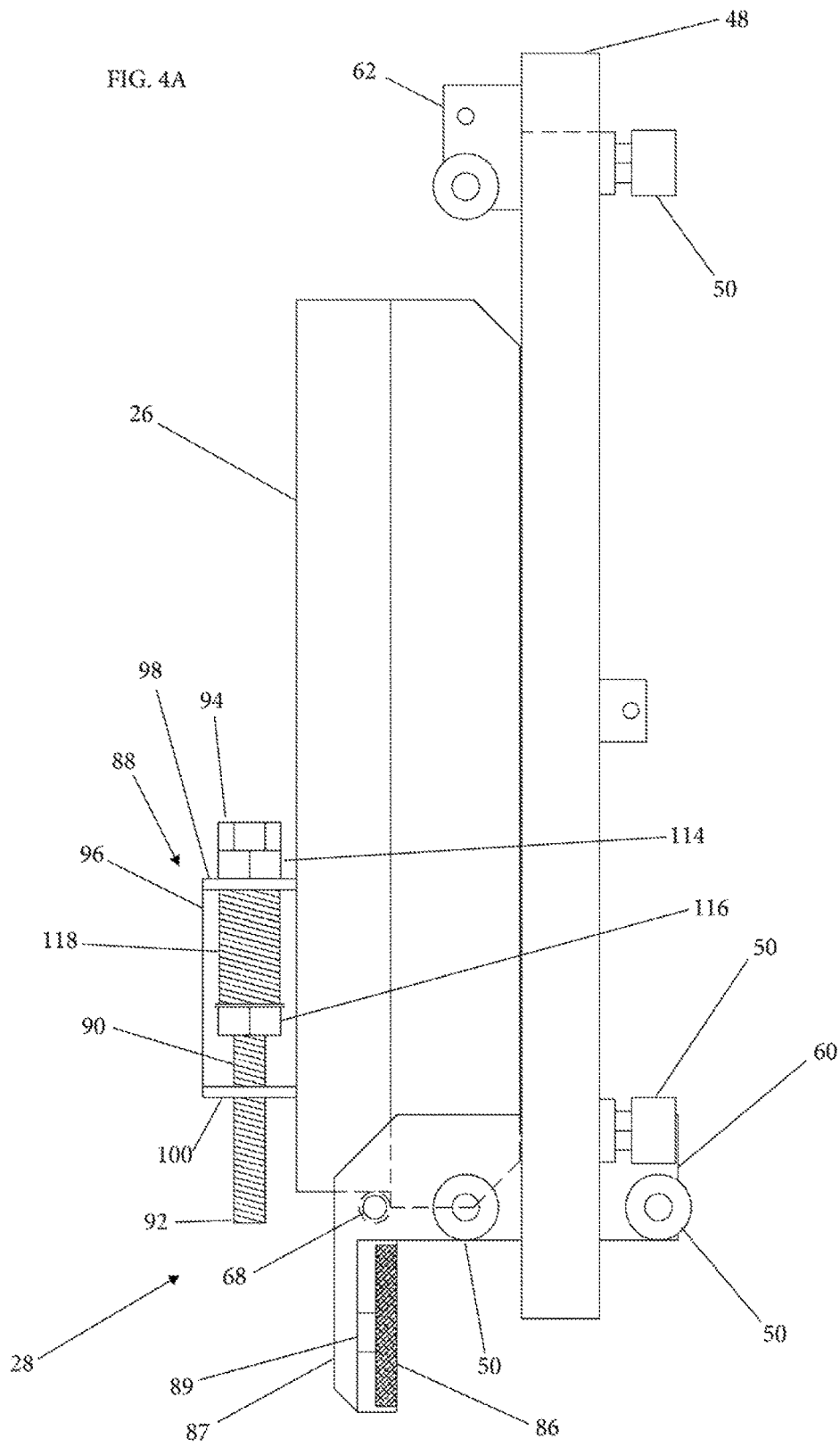

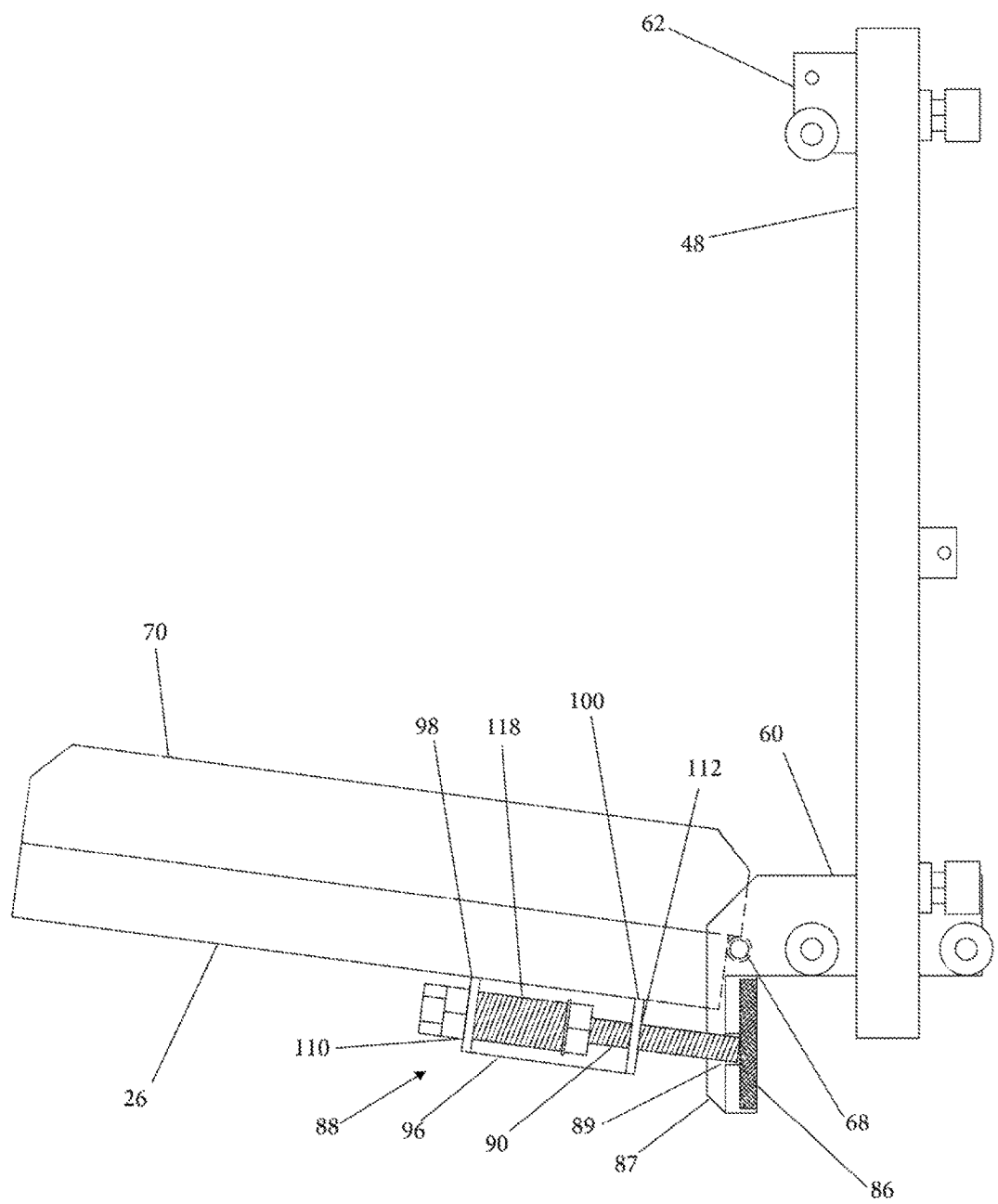

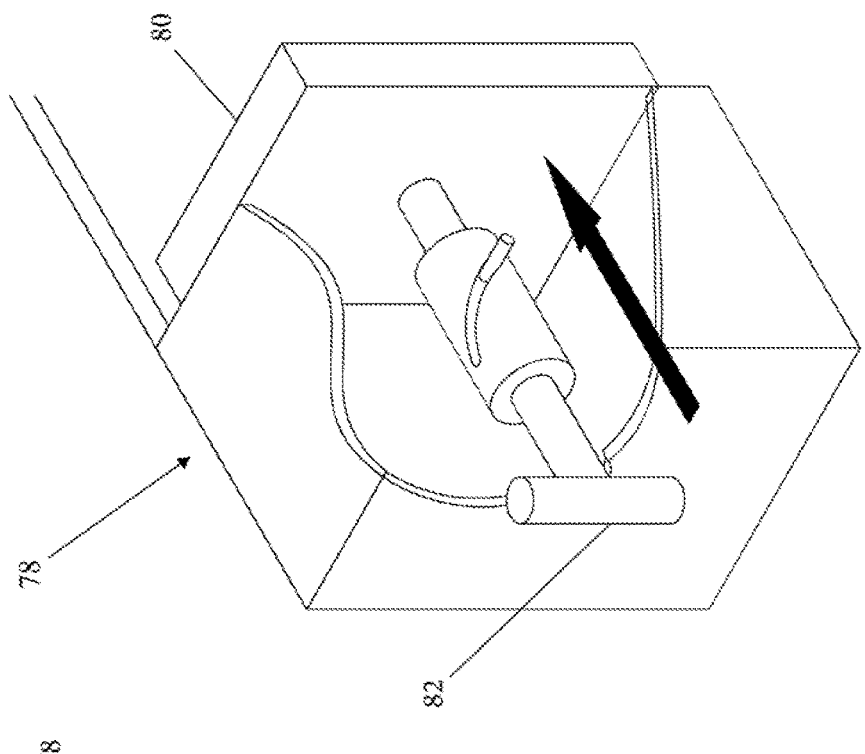
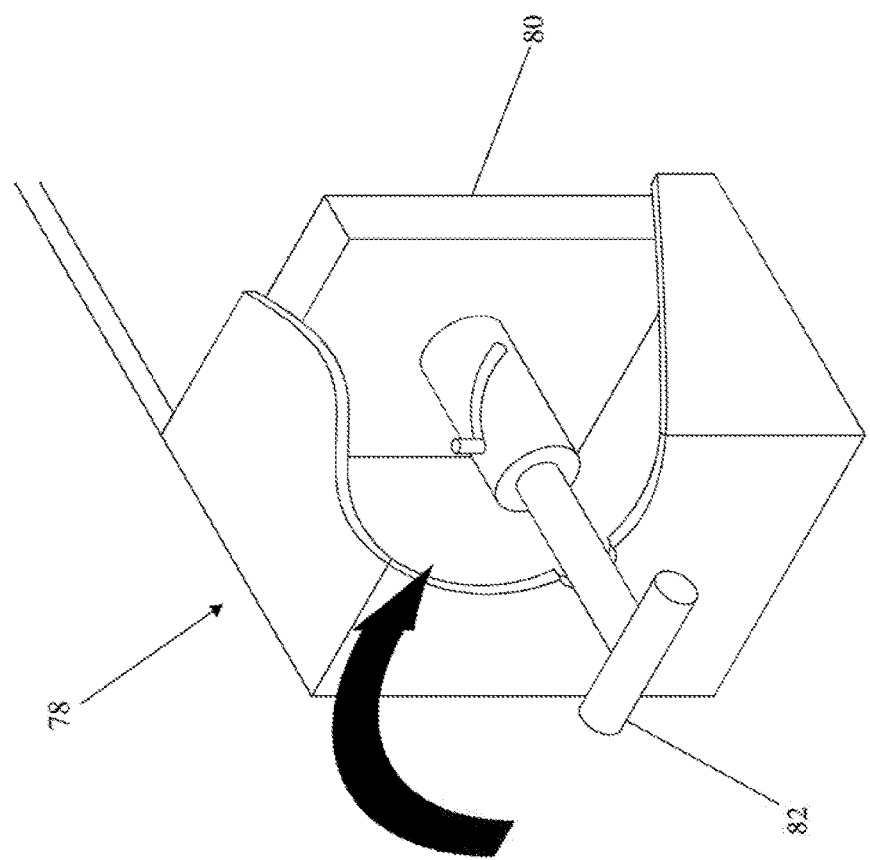

APPARATUS FOR STORING, TRANSPORTING AND DISTRIBUTING KEGS

CROSS-REFERENCE TO RELATED APPLICATION

This application is based upon and claims the priority filing date of the previously filed, copending U.S. Provisional patent application entitled "KEG ELEVATOR" filed Feb. 10, 2013, Ser. No. 61/762,932, the entire disclosure of which is hereby incorporated herein by reference.

BACKGROUND

The present invention relates to an apparatus that pertains to loading, storing, transporting and unloading one or more kegs of various sizes efficiently and effectively.

The distribution of kegs is well known to be difficult, time consuming and sometimes dangerous due to their excessive weight, size and irregular shape. Lifting and carrying of kegs can cause strain on the neck, back and shoulders resulting in injury.

A keg typically resembles the shape of a cylinder or is more commonly recognized as a barrel. Kegs are made of stainless steel or aluminum, and contain several gallons of beer. In the U.S., brewers typically sell kegs varying in capacity ranging from 5 Gallons to 15.5 Gallons weighing up to 170 lbs. Kegs vary significantly in size with diameters commonly ranging from 9¼ inches up to 16 inches and keg heights commonly ranging from 13⅞ inches and 23⅜ inches.

Customary to the industry, various size kegs carrying different products are distributed to many different locations during a delivery route. Lately this issues has been magnified by the popularization of craft beer produced by an exploding number of microbreweries. Typical bars no longer carry just the big brand names, but a myriad of local and region craft beers as demanded by the consumer. Thus, the number of desired kegs containing different kinds of beer has vastly increased.

Moreover, because of the differences in keg shape, size, weight, delivery destination, time schedules and demand, it can be a challenge to organize existing distribution trucks to efficiently load in an orderly, space efficient, and timely manner for unique delivery routes. While out for delivery, deliverymen sometimes have to shuffle around many kegs within the truck in order to properly select the correct keg(s) for a certain delivery. This process is carried out numerous times throughout the course of a delivery route. This collectively wastes time and energy while increasing the risk of injury.

The present invention provides a device for reducing these problems. The difficulties inherent in the art are therefore overcome in a way which is simple and efficient, while providing better and more advantageous results.

SUMMARY

In accordance with the invention, a method and apparatus for efficiently loading, storing, transporting and distributing various sized kegs is provided which enables a user to safely and easily —while under complete control—load and unload one or more kegs stored on one or more shelves.

The apparatus comprises a keg shelving assembly having two or more vertically stacked shelves for storing one or more kegs in a uniform horizontal position; a fixed frame vertical guidance assembly operably attached to the front of the keg shelving assembly; a vertical sliding frame adapted to be movable within the same plane as the fixed frame vertical guidance assembly; a platform which is hingedly connected to the vertical sliding frame configured to move in a path of motion having at least an open horizontal position and a closed vertical position relative to the vertical sliding frame and at least one brake assembly.

In a version, the braking assembly comprises a vertically extending braking surface extending vertically parallel to the path of motion of the vertical sliding frame. A brake pad is provided which is affixed to the vertical sliding frame. The brake pad is operably positioned adjacent to the vertically extending braking surface, whereby as the vertical sliding frame is moved through the vertical path, the brake pad is continuously adjacent to the vertically extending braking surface. Moreover, the version further comprises a member for actuating the brake assembly. The member for actuating the brake assembly is operably attached to the platform and positioned to engage the brake pad only when a downward load is applied to the platform. Thus, as a load is applied to the platform, such as a keg, the member for actuating the brake assembly simultaneously applies the brake pad to the vertically extending braking surface. The braking force created by the braking assembly is substantially equivalent of the load that is applied to the platform. Thus, the platform and keg are suspended in a static position until acted upon by the user.

In order to accommodate varying loads on the platform, a version of the invention may further comprise a force adjustment means for adjusting the force that is applied to the brake pad while the platform is loaded.

The apparatus can be made to adapt to the needs of the beer distribution industry. The apparatus can be loaded by a fork lift, have the ability to be lifted by a fork lift, and have the ability to be stacked—one on top of the other for warehouse purposes. The apparatus can also be configured to fit into to existing and future delivery trucks and storage facilities.

Still other benefits and advantages of the invention will become apparent to those skilled in the art to which it pertains upon a reading and understanding of the following detailed specification.

BRIEF DESCRIPTION OF THE DRAWINGS

These and other features, aspects, and advantages of the present invention will become better understood with regard to the following description, appended claims, and accompanying drawings where:

FIG. 1B is a perspective view of the version shown in FIG. 1A showing the platform in the open, horizontal position while unloaded.

FIG. 1C is a perspective view of the version shown in FIG. 1A showing the platform in the open, horizontal position while being loaded with a keg.

FIG. 1D is a perspective view of the version shown in FIG. 1A showing the platform and vertical sliding frame in a lower position while being loaded with a keg.

FIG. 2A is a front, side perspective view of the vertical sliding frame and platform showing the platform in the vertical, close position.

FIG. 2B is a front, side perspective view of the vertical sliding frame and platform showing the platform in the horizontal, open position.

FIG. 4A is a right side close-up view showing the vertical sliding frame and platform in the vertical, closed position of the version shown in FIG. 1A.

FIG. 4B is a right side close-up view showing the platform in the open, horizontal position while the platform is unloaded.

FIG. 6A is a perspective close-up view of the selectable locking means in the unlocked position.

FIG. 6B is a perspective close-up view of the selectable locking means in the locked position.

DESCRIPTION

Figure 1A:
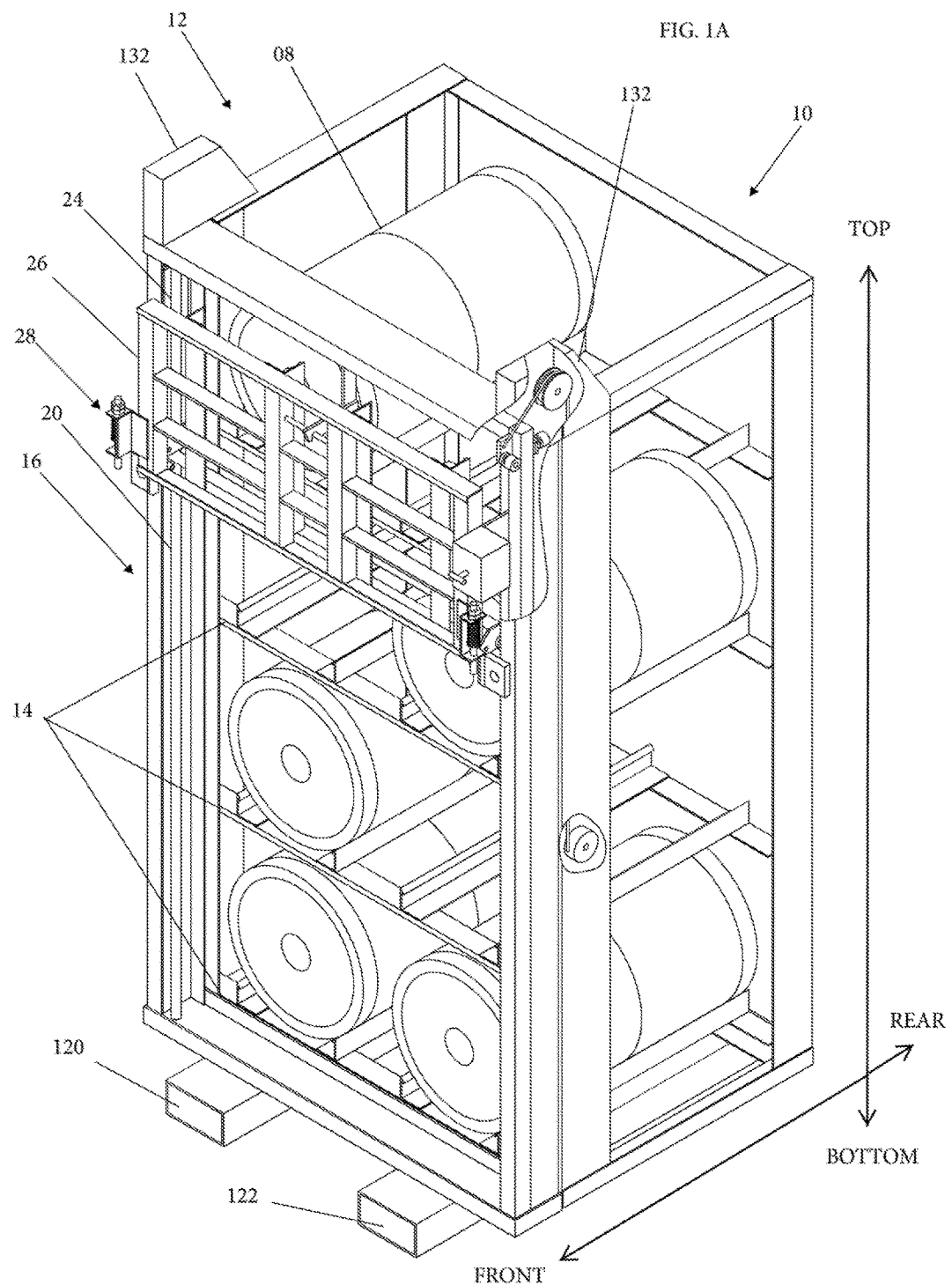
FIG. 1A is a perspective view of an apparatus embodying features of the present invention showing the platform in a raised, closed position.

Referring now to the drawings wherein the showings are for purposes of illustrating a preferred version of the invention only and not for purposes of limiting the same, the present invention is an apparatus for loading, storing, transporting, and distributing kegs.

With reference to FIG. 1A, the major components of the apparatus will be described. The version 10 comprises a keg shelving assembly 12 comprising four vertically stacked shelves 14 for storing one or more kegs 08 in a uniform horizontal position. Version 10 further comprises a fixed frame vertical guidance assembly 16 operably attached to the front of the keg shelving assembly 12. The fixed frame vertical guidance assembly 16 comprises one or more vertical guides. The one or more vertical guides are a first and second vertically disposed guide rods 38, 40. A vertical sliding frame 22 is adapted to be movable within the same vertical plane as the fixed frame vertical guidance assembly 16. The vertical sliding frame 22 comprises one or more support guides adapted to receive the one or more vertical guides. The one or more support guides are a first and second vertically disposed support guides 46, 48. A platform 26 is provided which is hingedly connected to the vertical sliding frame 22. The platform 26 is configured to move outward in a path of motion having at least a closed vertical position and an open horizontal position relative to the vertical sliding frame 22. Lastly, the version 10 comprises at least one brake assembly 28.

Referring to FIG. 1 and FIG. 2 the keg shelving assembly 12 comprises four vertically stacked shelves 14 containing two keg slots 30 per vertically stacked shelf 14 for storing a total of eight kegs 08 in a uniform horizontal position. The keg slots 30 are formed by at least two horizontally disposed rails 32 extending lengthwise from the front to the rear of the keg shelving assembly 12 supported by a front horizontal support member 34 and a rear horizontal support member 36. The horizontally disposed rails 32 are sufficiently positioned apart for receiving all sizes of kegs 08. Optionally, the distance between or the height of the horizontally disposed rails 32 may be adjustable.

With reference to FIG. 1A-2B, the fixed frame vertical guidance assembly 16 is operably affixed to the front of the keg shelving assembly 12 in order to provide the vertical sliding frame 22 a freely moveable vertical path of motion adjacent to the front of the vertically stacked shelves 14. In the version 10, the fixed frame vertical guidance assembly 16 is formed by a left side support member 52 and a right side support member 54 connected by upper support member 58 and lower support member 56. The first and a second vertically disposed guide rods 38, 40 extend vertically within the first and second vertically disposed channels 42, 44.

The vertical sliding frame 22 is adaptable to be selectively movable within the vertical plane as the fixed frame vertical guidance assembly 16. In the version 10, the vertical sliding frame 22 comprises a first and second support guides 46, 48 having a first and second linear bearings which are vertically disposed for receiving the first and second vertically disposed guide rods 38, 40. A lower support member 60 and an upper support member 62 connects the first and second support guides 46, 48 forming the vertical sliding frame 22. Further, the vertical sliding frame 22 may utilize one or more conveyor rollers 50 operably positioned to guide the vertical sliding frame 22 within the first and second vertically disposed channels 42, 44. Thus, enabling the vertical sliding frame 22 and platform 26 to move freely within the same plane as the fixed frame vertical guidance assembly 16.

The platform 26 has a front support member 64 and a rear support member 66 connected by a left support member 72 and a right support member 74. The platform 26 is attached to the vertical sliding frame 22 by hinge 68 and is configured to move outward in a path of motion having at least a closed vertical position and an open horizontal position relative to the vertical sliding frame 22. A first and second platform cable supports 73, 75 are connected to the right and left sides of the upper support member 62 of the vertical sliding frame 22 and to the corresponding right and left sides of the front support member 64 of the platform 26. The first and second platform cable supports 73, 75 operate to support the platform 26 in the open horizontal position while loaded. The platform 26 further comprises at least two or more parallel rails 70 which extend lengthwise between the front support member 64 and the rear support member 66 capable of receiving and holding a keg in the horizontal position.

The platform 26 further comprises a means for selectively securing the platform in the closed vertical position or a latch 76. The latch 76 selectively connects the platform 26 to the vertical sliding frame 22 while in the closed position.

In the version 10, a selectable locking means 78 for retaining the vertical sliding frame and platform assembly from vertically sliding through the path of motion is utilized. As depicted in FIGS. 6A and 6B, a magnet lock 80 is selectively engaged by a switch 82 with the fixed frame vertical guidance assembly 16. Engaging the magnet lock 80 maintains a desired vertical height of the vertical sliding frame 22 and platform 26.

Figure 5:
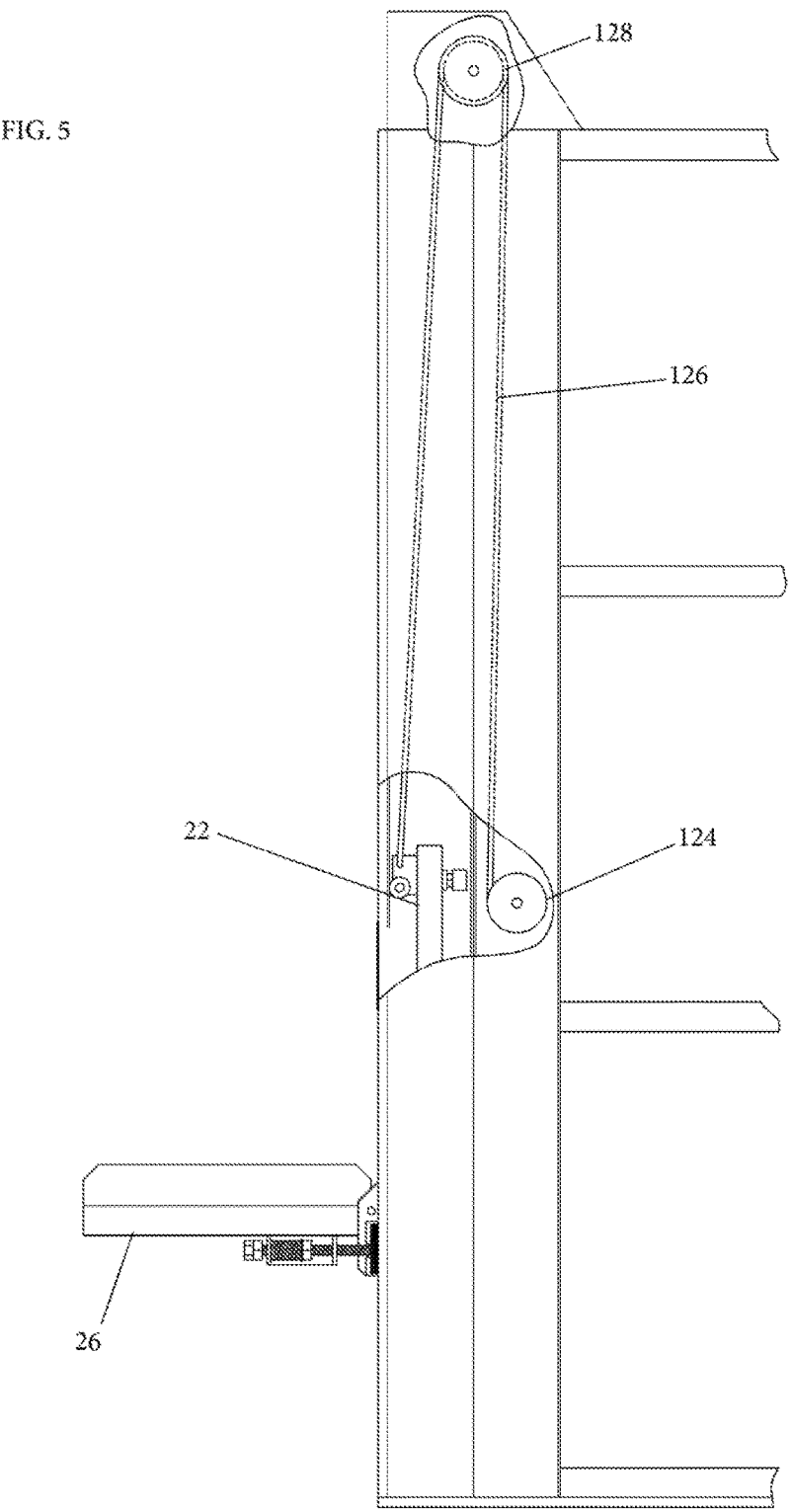
FIG. 5 is a right side cut away view showing the means for counter balancing the combined weight of the vertical sliding frame and the platform.

Referring to FIG. 5, in order to balance the combined weight of the vertical sliding frame 22 and the platform 26, a means for counter balancing is provided. In the version 10, the means for counter balancing is a constant force spring 124 fixedly attached to the apparatus framework or any other static part of the apparatus 10. The constant force spring 124 is operably attached to a cable 126 and pulley 128 system. The cable 126 and pulley 128 system provide an upward, counter balancing force to the vertical sliding frame 22 created by the constant force spring 124. Thus, consistently balancing and maintaining the vertical position of the vertical sliding frame 22 and platform 26 during operation and while the platform 26 is unloaded.

Referring to FIG. 2A-4C, the brake assembly 28 will be described. The version 10 utilizes two brake assemblies 28—located on the right and left sides of the vertical path of motion of the vertical sliding frame 22 and platform 26. The brake assemblies 28 comprise a metal braking surface 84 which is operably attached to the right side support member 54 and the left side support member 52 of the fixed frame vertical guidance assembly 16, extending vertically parallel to the path of motion of the vertical sliding frame 22.

Figure 3:
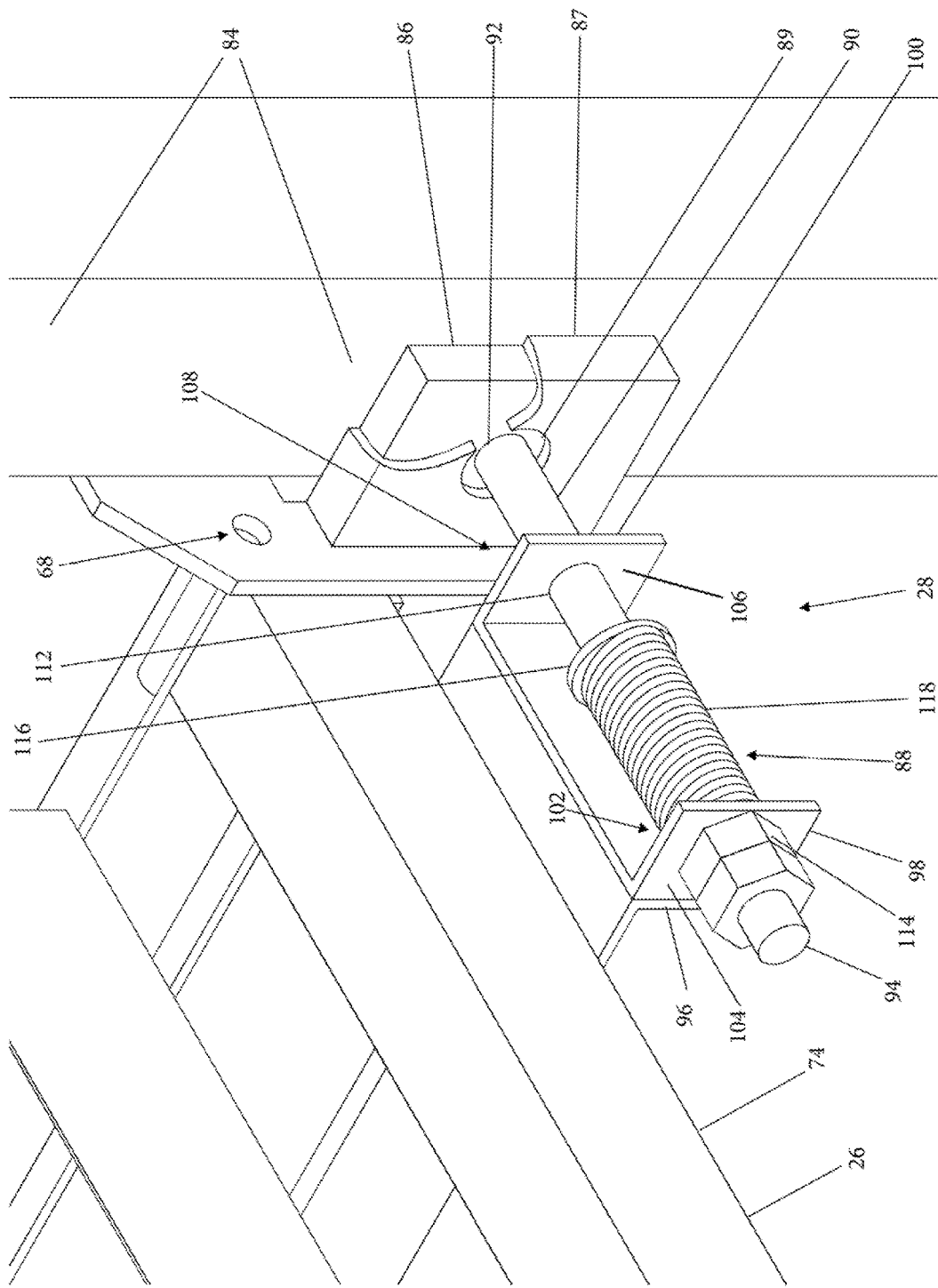
FIG. 3 is a front perspective close-up view of the brake assembly of the version shown in FIG. 1A.

Referring to FIG. 3, a brake pad 86 is fixedly attached to the vertical sliding frame 22 via a support bracket 87. The support bracket has an access hole 89 which exposes the rear of the brake pad 86. As an alternative, a plate may be utilized that is wedged between the support bracket 87 and the brake pad 86 in order to distribute the force applied to the brake pad 86 more evenly. The brake pad(s) 86 are operably positioned adjacent to the vertically extending metal braking surfaces 84. Thus, as the vertical sliding frame 22 is moved through the vertical path, the brake pads 86 are continuously adjacent to the metal braking surfaces 84.

The brake assembly 88 further comprises a member for actuating the brake pad 86 operably attached to the platform 26 and positioned to engage the rear of the brake pad 86 when a downward load is applied to the platform 26. When the brake pad 86 is actuated, the brake pad moves towards the metal braking surface 84. This creates a braking action that opposes the downward force created by the load upon the platform 26 and vertical sliding frame 22.

Figure 4C:
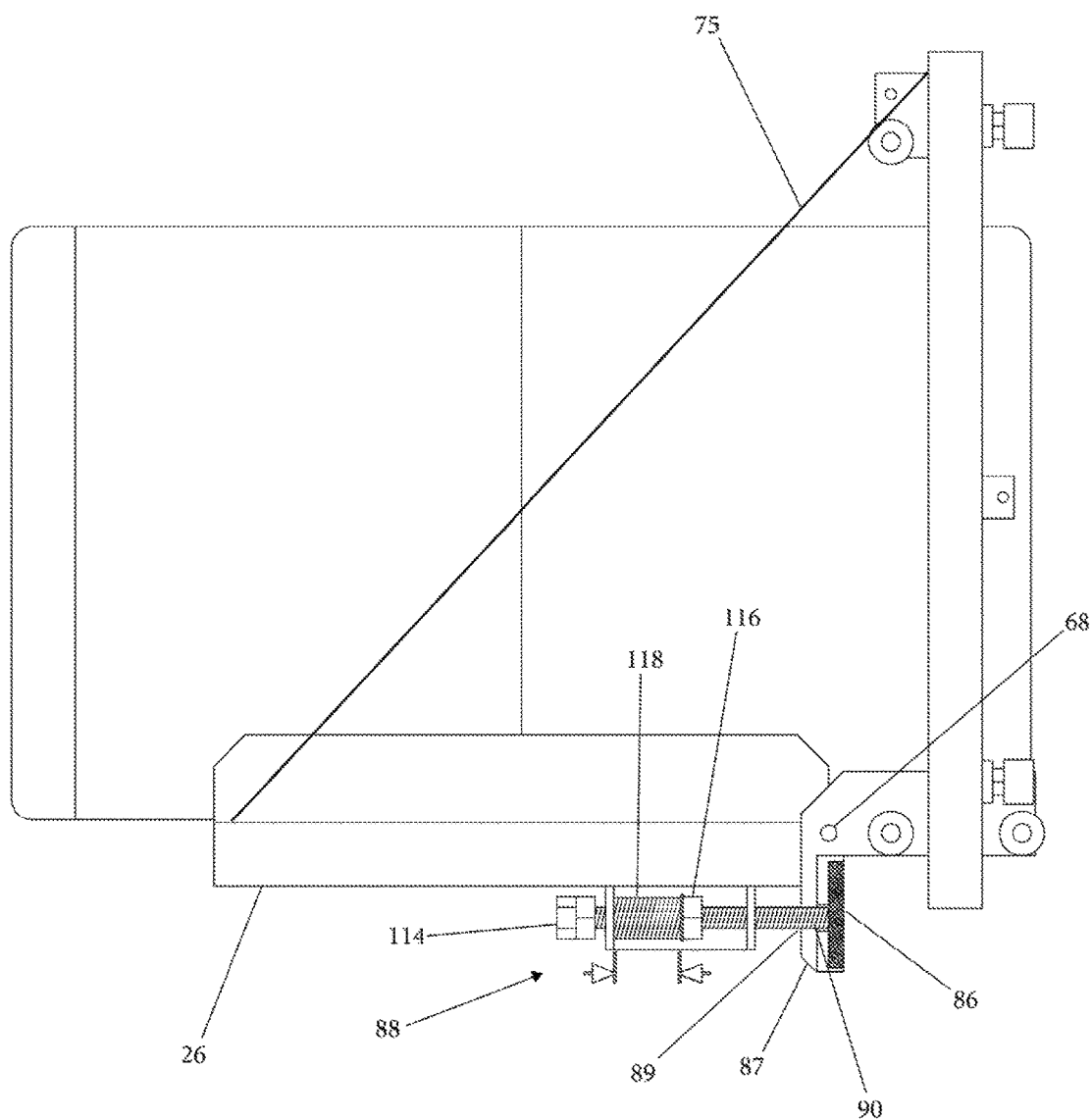
FIG. 4C is a right side close-up view showing the platform in the open, horizontal position while the platform is loaded with a keg.

As detailed by FIG. 3-FIG. 4C, the member for actuating the brake assembly 88 is an elongated rigid member 90 having a contact end 92 and a distal end 94. The elongated rigid member 90 provides an applied force to the brake pad 86. The elongated rigid member can be a pin or a bolt with threading. Further, the brake assembly 28 comprises a support bracket 96 for supporting the elongated rigid member 90 fixedly attached to the platform 26. The support bracket 96 comprises a first and second support members 98, 100. The first and second support members 98, 100 are disposed in parallel. The first support member 98 has an inner surface 102 and an outer surface 104. The second support member 100 has an inner surface 106 and an outer surface 108. The first and second support members 98, 100 comprise linearly aligned first and second holes 110, 112. The elongated rigid member 90 passes through the first and second holes 110, 112. The elongated rigid member 90 is held into place within the support bracket 96 by a first and second adjustable nuts 114, 116. The first adjustable nut 114 is positioned or threaded onto the distal end 94 of the elongated rigid member 90 exterior of the outer surface 104 of the first support member 98. The second adjustable nut 116 is positioned or threaded onto the elongated rigid member 90 between the first support member 98 and the second support member 100. Lastly, a compression spring 118 is provided as a force adjustment means—which adjusts the force that is applied to the brake pad 86 to accommodate varying loads on the platform 26. As an example, a 2 inch by ¾ inch 300 lb rated compression spring can be used. The compression spring 118 is positioned to encase the elongated rigid member 90 lengthwise between the second adjustable nut 116 and the inner surface 102 of the first support member 98. Thus, the first adjustable nut 114 can be adjusted to increase or decrease the position of the contact end 92 in relation to the support bracket 96 and platform 26, and the second adjustable nut 116 can be adjusted to increase or decrease the compression force of the compression spring 118.

The apparatus 10 further comprises the ability to be moved by a forklift or other piece of machinery. A first and second horizontally disposed fork slots 120, 122 are fixedly attached to and extend lengthwise from the front to the rear of the apparatus 10.

The apparatus 10 can also be stacked one on top of another utilizing one or more insert receivers 130 located at the bottom of the apparatus and one or more inserts 132 at the top. When one or more apparatuses are stacked, the one or more insert recievers 130 of the higher apparatus are fit over the one or more inserts 132 of the lower apparatus.

Now referring to FIG. 1A-6B, the method of operation of the version 10 of the invention will be described. FIG. 1A shows the apparatus 10 in the ideal configuration while the apparatus is being stowed or while in transit within a delivery truck. The vertical sliding frame 22 and platform 26 are locked in the raised, closed position via the magnetic lock 80 and the latch 76. As depicted by FIGS. 2A and 4A, the platform 26 is in the vertical, closed position secured by latch 76. While in this position, the member for actuating the brake assembly 88 is not engaged with the brake pad 86.

Ideally, kegs are loaded onto the apparatus 10 by a fork lift. Individual kegs are received horizontally into each individual keg slots 30 via the platform 26 and the horizontally disposed rails 32. Kegs can also be loaded by hand or, optionally, the apparatus 10 can be outfitted with a motor to lift a loaded platform 26 to the desired level in order to load the kegs to the desired keg slot 30.

Once the kegs are loaded onto the desired keg slots 30, the apparatus 10 is ready to be stowed in a warehouse for future delivery or ready to be inserted into a delivery truck. A fork lift is provided to engage, lift and move the apparatus 10 by first and second horizontally disposed fork slots 120, 122. Once the truck has been loaded with the apparatus 10, the delivery truck is ready to deliver the kegs 08 to their specified destinations. More than one apparatus can be loaded onto an individual truck depending on truck size and other factors.

Once at the delivery destination, the apparatus 10 within the delivery truck is ready to be unloaded. The user first selects the keg 08 that is desired to be delivered. Firstly, the user unlocks the magnetic lock (FIGS. 6A and 6B) which enables the user to easily slide the vertical sliding frame 22 and closed platform 26 upward or downward to the desired level—while counter balanced by the constant force spring 124. Optionally, the fixed frame vertical guidance assembly 16 may have indicia which correlates with the vertical sliding frame 22 to assist the user in finding the correct platform 26 height for the desired vertically stacked shelf 14. Once the correct height is obtained, the user secures the position by engaging the magnetic lock as shown in FIGS. 6A and 6B. As depicted in FIG. 1B, FIGS. 2A, 2B and 4B, the latch 76 is disengaged—allowing the platform 26 to lower into the open, horizontal position ready to receive a keg 08. At this point, the desired keg 08 is pulled from its keg slot 30 and onto the platform 26 via the platform rails 70 as illustrated by FIG. 1C, FIG. 3 and FIG. 4C. At this point, the full weight of the keg is applied downward which actuates the brake assembly 28. The brake assembly 28 is calibrated for certain keg 08 weights by the force adjustment means or the compression spring 118. Thus, the braking force created by the braking assembly 28 is substantially equivalent to the downward weight that is applied to the platform 26 by the keg 08. Thus, the platform 26 and keg 08 are suspended in a static position until acted upon by the user. In order to lower the keg 08, the user simply applies a minimal downward force on the platform 26 resulting in the platform 26 and keg 08 easily and controllably descending to the bottom of the apparatus 10 as illustrated by FIG. 1D. At this point, the user can load the keg 08 onto a cart and on to the delivery point.

After the keg 08 is removed from the platform 26, the user can select another keg 08 to unload or the user can place the apparatus 10 back into the stowed position by moving the platform 26 back into the closed position, secured by the latch 76 and then moving the platform 26 and sliding frame assembly 22 to the raised position. At this point, the magnetic lock 80 is engaged to secure the platform 26 and vertical sliding frame 22 in the vertical position. The user can then move on to his next deliver destination.

All of the embodiments of the present invention can be made portable, adaptable, or permanent and fit to any size of required space or truck. Particularly, it can be outfitted to meet the needs of the beer distribution industry.

The present invention can be made in any manner and of any material chosen with sound engineering judgment such as steel. The materials may be strong, lightweight, long lasting, economic, and ergonomic.

The previously described versions of the present invention have advantages, including the ability to load, store and distribute various sized kegs in a safe and efficient manner.

Although preferred embodiments of the invention have been described in considerable detail, other versions and embodiments of the invention are possible. Therefore, the present invention should not be limited to the preferred embodiments described herein, but instead is defined by the spirit and scope of the appended claims.

What is claimed is:

1. An apparatus for storing, transporting and distributing kegs comprising:
   (a) a keg shelving assembly comprising a front, a rear, and two or more vertically stacked shelves for storing one or more kegs in a uniform horizontal position;
   (b) a fixed frame vertical guidance assembly operably attached to the front of the keg shelving assembly comprising one or more vertical guides;
   (c) a vertical sliding frame adapted to be movable within the same vertical plane as the fixed frame guidance vertical assembly comprising one or more support guides adapted to receive the one or more vertical guides;
   (d) a platform comprising a front and a rear, wherein the platform is hingedly connected to the vertical sliding frame having an axis of rotation configured to move in a path of motion having at least a closed vertical position and an open horizontal position relative to the vertical sliding frame; and
   (e) at least one brake assembly comprising:
      (i) a metal braking surface extending vertically parallel to the path of motion of the vertical sliding frame;
      (ii) a brake pad fixedly attached to the vertical sliding frame, the brake pad is operably positioned adjacent to the metal braking surface, whereby as the vertical sliding frame is moved through the vertical path, the brake pad is continuously adjacent to the metal braking surface; and
      (iii) a member for actuating the brake assembly, wherein the member for actuating the brake assembly is rigid having a contact end, the member is operably attached to the platform with the contact end positioned adjacent and normal to the brake pad and below the axis of rotation of the platform while the platform is in the open horizontal position in order to engage the brake pad when a downward load is applied to the platform,
   whereby a braking force is created by the brake assembly to counter balance the downward force created by the load on the platform.

2. The apparatus of claim 1, further comprising a means for counter balancing the combined weight of the vertical sliding frame and the platform when the platform is unloaded, whereby consistently maintaining the vertical position of the vertical sliding frame and platform while unloaded.

3. The apparatus of claim 2, wherein the means for counter balancing the combined weight of the vertical sliding frame and the platform is a constant force spring, the constant force spring is fixedly attached to a static part of the apparatus, and wherein a cable connects the constant force spring to the vertical sliding frame.

4. The apparatus of claim 1, wherein the one or more vertically stacked shelves comprise one or more individual keg slots for receiving and holding a keg in the horizontal position, wherein each keg slot is formed by at least two horizontally disposed rails extending lengthwise from the front to the rear of the keg shelving, whereby a keg is easily inserted into or extracted from the keg slot by sliding on the horizontally disposed rails.

5. The apparatus of claim 4, wherein the platform further comprises at least two or more parallel rails extending lengthwise between the front and the rear of the platform, the two or more horizontally disposed rails are sufficiently positioned apart for receiving from and guiding a keg to a corresponding keg slot within the one or more vertically stacked shelves.

6. The apparatus of claim 1, wherein the one or more vertical guides are a first and a second vertically disposed guide rods extending vertically lengthwise; and a first and second support guides vertically disposed for receiving the first and second vertically disposed guide rods, whereby enabling the vertical sliding frame and platform to move freely within the same plane as the fixed frame vertical guidance assembly.

7. The apparatus of claim 6, wherein the fixed frame vertical guidance assembly further comprises a first and a second vertically disposed channels, the first and a second vertically disposed guide rods extending vertically lengthwise within the first and second vertically disposed channels; and wherein the vertical sliding frame further comprises one or more conveyor rollers operably positioned to guide the vertical sliding frame within the first and second vertically disposed channels, whereby enabling the vertical sliding frame and platform assembly to move freely within the same plane as the fixed frame vertical guidance assembly.

8. The apparatus of claim 1, wherein the brake assembly further comprises a force adjustment means for adjusting the force that is applied to the brake to accommodate varying loads on the platform, wherein the force adjustment means is operably connected to the member for actuating the brake assembly.

9. The apparatus of claim 8, wherein the means for adjusting the force that is applied to the brake is a compression spring.

10. The apparatus of claim 1, wherein the member for actuating the brake assembly is an elongated rigid member having a contact end and a distal end; and wherein the brake assembly further comprises:
   (i) a support bracket for supporting the elongated rigid member fixedly attached to the platform, the support bracket comprising first and second support members, the first and second support members are disposed in parallel, the first support member has an inner surface and an outer surface, the second support member has and inner surface and an outer surface, and the first and second support members comprise linearly aligned first and second holes;

(ii) wherein the elongated rigid member freely passes through the first and second holes;

(iii) first and second adjustable nuts, the first adjustable nut is threaded onto the distal end of the elongated rigid member exterior of the outer surface of the first support member, the second adjustable nut is threaded onto the elongated rigid member between the first and second support members; and (iv) a compression spring for adjusting the force that is applied to the brake to accommodate varying loads on the platform, wherein the spring encases the elongated rigid member lengthwise between the second adjustable nut and the inner surface of the first support member, whereby the first nut can be adjusted to increase or decrease the position of the contact end in relation to the support bracket and the second nut can be adjusted to increase or decrease the compression force of the spring.

11. The apparatus of claim 1, having a first and second braking assemblies, first and second braking assemblies are operably positioned adjacent to the right and left sides of the vertical sliding frame.

12. The apparatus of claim 1, further comprising a means for selectively securing the platform in the closed vertical position.

13. The apparatus of claim 1, further comprising a selectable locking means for retaining the vertical sliding frame and platform from vertically sliding through the path of motion, whereby allowing the user to selectively maintain a desired vertical height of the vertical sliding frame and platform.

14. The apparatus of claim 1, further comprising first and second horizontally disposed fork slots adapted to receive the forks of a fork lift, the first and second horizontally disposed fork slots are fixedly attached to and extend lengthwise from the front to the rear of the apparatus.

15. The apparatus of claim 1, further comprising one or more insert receivers positioned at the bottom of the apparatus and one or more inserts positioned at the top of the apparatus, the apparatus having the ability to be stacked one on top of another fitting the one or more insert receivers with the one or more inserts while stacking.

16. The apparatus of claim 1, further comprising one or more platform cable supports, the platform cable support is connected between the upper support member of the vertical sliding frame and the front support member of the platform, wherein the cable is configured to assist in supporting the platform in the horizontal open position while loaded.

17. An apparatus for storing, transporting and distributing kegs comprising:

(a) a keg shelving assembly comprising a front, rear, and two or more vertically stacked shelves for storing one or more kegs in a uniform horizontal position;

(b) a fixed frame vertical guidance assembly operably attached to the front of the keg shelving assembly comprising one or more vertical guides;

(c) a vertical sliding frame adapted to be selectively movable within the same plane as the fixed frame vertical guidance assembly comprising one or more support guides adapted to receive one or more vertical guides;

(d) a platform comprising a front and a rear, wherein the platform is hingedly connected to the vertical sliding frame configured to move outward in a path of motion having at least a closed vertical position and an open horizontal position relative to the vertical sliding frame;

(e) at least one brake assembly comprising:

(i) a metal braking surface operably attached to the fixed frame vertical guidance assembly extending vertically parallel to the path of motion of the vertical sliding frame;

(ii) a brake pad fixedly attached to the vertical sliding frame, wherein the brake pad is operably positioned adjacent to the metal braking surface, whereby as the vertical sliding frame is moved through the vertical path, the brake pad is continuously adjacent to the metal braking surface;

(iii) an elongated rigid member for providing an applied force to the brake pad in the direction of the metal braking surface while the platform is in the open horizontal position while loaded, the elongated rigid member comprising a contact end and a distal end;

(iv) a support bracket for supporting the elongated rigid member which is fixedly attached to the platform, the support bracket having first and second support members, the first and second support members are disposed in parallel, the first support member has an inner surface and an outer surface, the second support member has and inner surface and an outer surface, the first and second support members comprise linearly aligned first and second holes;

(v) wherein the elongated rigid member freely passes through the first and second holes; (vi) first and second adjustable nuts, the first adjustable nut is threaded onto the distal end of the elongated rigid member exterior of the outer surface of the first support member, the second adjustable nut is threaded onto the elongated rigid member between the first and second support member; and (vii) a compression spring for adjusting the force that is applied to the brake to accommodate varying loads on the platform, wherein the spring encases the elongated rigid member lengthwise between the second adjustable nut and the inner surface of the first support member, whereby the first nut can be adjusted to increase or decrease the position of the contact end in relation to the support bracket and the second nut can be adjusted to increase or decrease the compression force of the spring; and (f) a means for counter balancing the weight of the vertical sliding frame and platform assembly while the platform is unloaded, whereby consistently maintaining the vertical sliding frame and platform assembly in a vertical position while unloaded.

18. The apparatus of claim 17, further comprising a means for selectively securing the platform in the closed vertical position.

19. The apparatus of claim 18, wherein the means for selectively securing the platform in the closed vertical position is a latch, the latch connecting the platform to the vertical sliding frame while the platform is in the close vertical position.

20. The apparatus of claim 17, further comprising a selectable locking means for retaining the vertical sliding frame and platform from vertically sliding through the path of motion, whereby allowing the user to selectively maintain a desired vertical height of the vertical sliding frame and platform.

21. The apparatus of claim 20, wherein the selectable locking means for retaining the vertical sliding frame and platform from vertically sliding through the path of motion comprises a magnet lock, the magnet lock fixedly attached to the vertical sliding frame and operably positioned to variably lock with the fixed frame vertical guidance assembly.

22. An apparatus for storing, transporting and distributing kegs comprising:
   (a) a keg shelving assembly having a front, a rear, a top and a bottom comprising:
      (i) two or more vertically stacked shelves for storing one or more kegs in a uniform horizontal position, wherein the two or more vertically stacked shelves comprise one or more individual keg slots for receiving and holding a keg in the horizontal position, wherein each keg slot is formed by at least two horizontally disposed rails extending lengthwise from the front to the rear of the keg shelving, whereby a keg is easily inserted into or extracted from the keg slot by sliding on the horizontally disposed rails;
   (b) a fixed frame vertical guidance assembly operably attached to the front of the keg shelving assembly comprising:
      (i) a first and a second vertically disposed channels, and
      (ii) a first and a second vertically disposed guide rods extending vertically lengthwise within first and second channels;
   (c) a vertical sliding frame adapted to be selectively movable within the same plane as the fixed frame vertical guidance assembly comprising a first and second vertically disposed support guides and first and second linear bearings that are received within the first and second support guides, the first and second linear bearings vertically disposed for receiving the first and second vertically disposed guide rods; one or more conveyor rollers operably attached to the vertical sliding frame adapted to roll within and along with the first and second channels, whereby enabling the vertical sliding frame and platform assembly to move freely within the same plane as the fixed frame vertical guidance assembly;
   (d) a platform having a front and a rear, wherein the platform is hingedly connected to the vertical sliding frame configured to move in a path of motion having at least a closed vertical position and an open horizontal position relative to the vertical sliding frame:
   (e) a means for selectively securing the platform in the closed vertical position;
   (f) a selectable locking means for retaining the vertical sliding frame and platform assembly from vertically sliding through the path of motion;
   (g) at least one brake assembly comprising:
      (i) a metal braking surface operably attached to the fixed frame vertical guidance assembly extending vertically parallel to the path of motion of the vertical sliding frame;
      (ii) a brake pad fixedly attached to the vertical sliding frame, wherein the brake pad is operably positioned adjacent to the metal braking surface, whereby as the vertical sliding frame is moved through the vertical path, the brake pad is always adjacent to the metal braking surface;
      (iii) an elongated rigid member for providing an applied force to the brake pad in the direction of the metal braking surface while the platform in the open horizontal position while loaded, the elongated rigid member comprising a contact end and a distal end;
      (iv) a support bracket for supporting the elongated rigid member which is fixedly attached to the platform, the support bracket having first and second support members, the first and second support members are disposed in parallel, the first support member has an inner surface and an outer surface, the second support member has and inner surface and an outer surface, the first and second support members comprise linearly aligned first and second holes;
      (v) wherein the elongated rigid member freely passes through the first and second holes;
      (vi) first and second adjustable nuts, the first adjustable nut is threaded onto the distal end of the elongated rigid member exterior of the outer surface of the first support member, the second adjustable nut is threaded onto the elongated rigid member between the first and second support member; and
      (vii) a compression spring for adjusting the force that is applied to the brake to accommodate varying loads on the platform, wherein the spring encases the elongated rigid member lengthwise between the second adjustable nut and the inner surface of the first support member, whereby the first nut can be adjusted to increase or decrease the position of the contact end in relation to the support bracket and the second nut can be adjusted to increase or decrease the compression force of the spring;
   (h) a means for counter balancing the weight of the vertical sliding frame and platform assembly while the platform is unloaded, whereby consistently maintaining the vertical sliding frame and platform assembly in a vertical position while unloaded;
   (i) a first and second horizontally disposed fork slots adapted to receive the forks of a fork lift, the first and second horizontally disposed fork slots fixedly attached to and extend lengthwise from the front to the rear of the apparatus; and
   (j) wherein the apparatus further comprises one or more insert receivers at the bottom of the apparatus and one or more inserts at the top of the apparatus, the apparatus having the ability to be stacked one on top of another fitting the one or more insert receivers with the one or more inserts while stacking.

\* \* \* \* \*